United States Patent Office 3,552,766
Patented Jan. 5, 1971

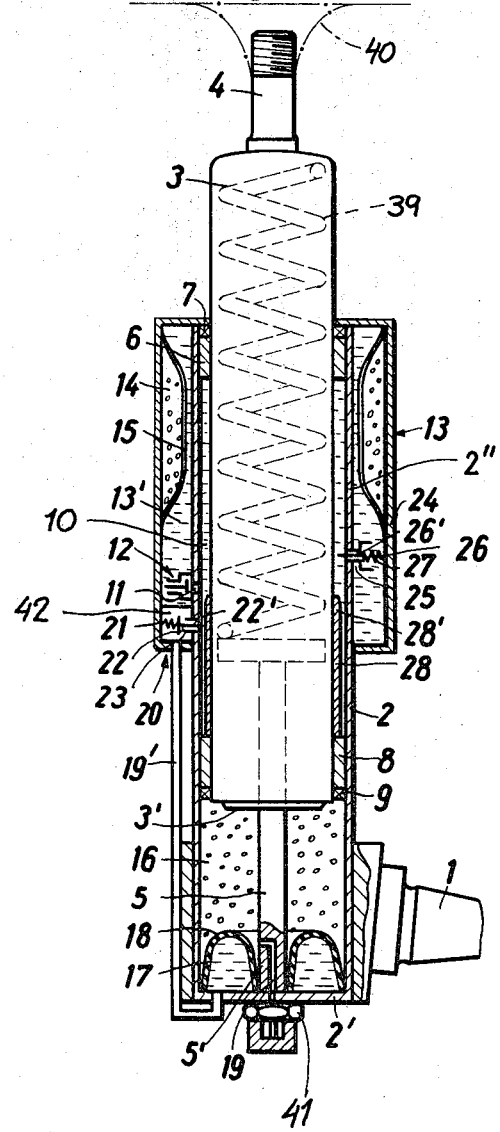

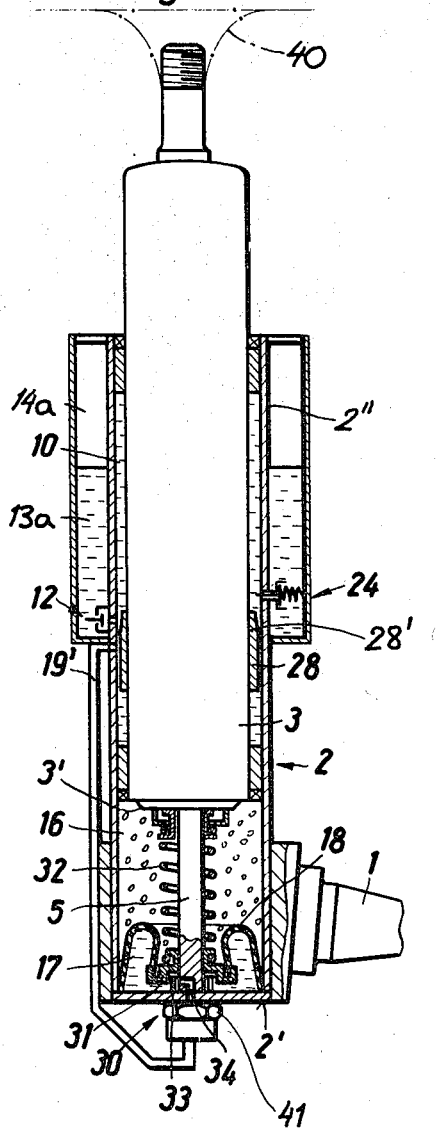

3,552,766
HYDRAULIC SUSPENSION SYSTEM FOR
AUTOMOTIVE VEHICLES
Herbert Jean Willich, Ennepetal-Altenvoerde, Germany, assignor to August Bilstein, Ennepetal-Altenvoerde, Germany, a corporation of Germany
Filed Feb. 3, 1969, Ser. No. 796,124
Claims priority, application Germany, Feb. 3, 1968, 1,655,923
Int. Cl. B60g 15/12
U.S. Cl. 280—124                        10 Claims

ABSTRACT OF THE DISCLOSURE

The cylinder (3) of a dashpot assembly, having a piston (5) secured to a surrounding (2), forms with that sleeve a pressure accumulator subdivided by a flexible membrane into an air compartment (16), and an oil compartment (17), the latter compartment communicating through a first check valve with a pumping chamber (10) which in turn communicates through a second check valve with an oil reservoir; the second check valve is shunted by a spring-loaded regulating valve. The pumping chamber has end walls respectively rigid with the sleeve and with the dashpot cylinder whereby relative motions of this cylinder and its piston tend to draw hydraulic liquid from the reservoir to the oil compartment to increase the gas pressure resisting contraction of the dashpot assembly. In a normal position of the assembly, this pumping action is suppressed by a cam (28), holding either the second check valve (20, FIG. 1) or the regulating valve (24, FIG. 2) permanently open, the latter valve being also held open in an extended position of the dashpot assembly to facilitate the return of excess liquid from the oil compartment to the reservoir; in the last-mentioned position the first check valve (20 or 30) is concurrently held open by a cam (28, FIG. 1) or a spring (32, FIG. 2) to complete the fluid path.

---

My present invention relates to a vehicular suspension system in which a wheel-supporting part, such as a front-wheel axle of an automotive vehicle, is yieldably connected with a body-supporting part, such as a wheel mount on the chassis of the vehicle, through the intermediary of a shock absorber including a piston and a cylinder.

The general object of my present invention is to provide simple and effective means in such system for automatically maintaining the body-supporting part substantially at a predetermined level in the face of considerably varying loads, with utilization of the shock-absorbing qualities of an interposed gas cushion and without the need for a pumping system driven by extraneous energy to maintain the necessary gas pressure.

This object is realized, pursuant to my instant invention, by the provision of a pressure accumulator formed in a space between an end of the cylinder of the shock absorber and a sleeve surrounding at least a portion of this cylinder, the sleeve being secured to the shock-absorber piston so that the pressure-accumulating space expands and contracts with the expansion and contraction of the shock absorber; a pumping chamber, having two relatively movable walls respectively secured to the piston (e.g. by way of a sleeve) and to the cylinder of the shock absorber, also varies in volume in the rhythm of the dimensional changes of the shock absorber, this pumping chamber being connected through a first check valve with a liquid compartment of the gas-accumulation space and through a second check valve with a reservoir containing a hydraulic fluid, such as oil. A mobile partition, such as a flexible membrane, separates the liquid compartment of the gas accumulator from a normally sealed gas compartment whose pressure resists contraction of the piston-and-cylinder assembly of the shock absorber. The two check valves are so oriented that, in response to volume changes of the pumping chamber induced by vertical oscillations of the moving vehicle, hydraulic fluid can be drawn from the reservoir into the pumping chamber and then discharged into the liquid compartment of the pressure accumulator, thereby increasing the gas pressure prevailing in the adjoining gas compartment so as to tend to raise the body-supporting part with reference to the wheel-supporting part of the vehicle; this, however, takes place only in a relatively contracted position of the shock absorber, the liquid compartment being vented to the reservoir in a relatively extended position of the assembly so that the gas pressure is reduced in the case of light loads.

More specifically, in a preferred embodiment, the venting of the liquid compartment to the reservoir is accomplished with the aid of a spring-loaded regulating valve shunting the second check valve so as to constitute a bypass adapted to relieve excess pressure in the pumping chamber. In the aforementioned extended position of the shock absorber, this regulating valve is held open by a cam carried, advantageously, on the shock-absorber cylinder so as to provide a continuous flow path by way of the first check valve which is concurrently held open by a similar cam or by a separate link coupled with the cylinder. In an intermediate position of the shock absorber, one of the check valves or the regulating valve is also held permanently open so that the aforedescribed pumping action is suppressed; thus, with normal loads the pressure of the gas cushion remains unchanged and the shock absorber functions in its conventional manner.

The invention will be described in greater detail with reference to the accompanying drawing in which:

FIG. 1 is a longitudinal sectional view of a vehicular suspension system according to the invention; and FIG. 2 is a view similar to FIG. 1, showing a modification.

The system shown in FIG. 1 comprises a conventional shock absorber including a cylinder 3 and a piston 5 whose rod projects from the lower end 3' of the cylinder. Piston 5 and cylinder 3 may be a conventional dashpot assembly, e.g. of the type wherein the piston has an orifice for letting oil pass slowly from one side to the other; an alternate construction, equally well known, includes an imperforate piston separating a vented air space from a fluid space communicating with an outer oil reservoir, a restricted passage. The assembly also includes a compression spring 39 tending to drive the cylinder upwardly with reference to piston 5.

As illustrated in the drawing, a stud 4 atop cylinder 3 is connected with the frame of an automotive vehicle diagrammatically indicated at 40; piston 5 is secured to an axle 1 supporting one of the wheels (not shown) of the vehicle, e.g. a front wheel. The connection between axle 1 and piston 5 includes a sleeve 2 having a closed bottom end 2' which is fastened to piston 5 by a screw connection 41 normally sealing a passage 19 which allows for the admission of a predetermined amount of gas (e.g. air) into a compartment 16 in the space between cylinder bottom 3' and sleeve bottom 2'. A mobile petition 18, here shown as a flexible but fluidtight membrane, separates the air compartment 16 from a liquid compartment 17 of variable volume; the overall volume of space 16, 17, representing a pressure accumulator, is seen to increase with a rise in the level of the vehicle frame 40 which extends the telescoped assembly 3–5.

An upward extension 2" of sleeve 2 defines with an intermediate portion of cylinder 3 a pumping chamber 10 having relatively mobile end walls 6, 8, these end walls being formed by a pair of rings respectively secured to the inner surface of sleeve extension 2" and to the outer surface of cylinder 3. Fluidtightness is ensured by a pair of annular gaskets 7 and 9 respectively carried by the rings 6 and 8.

Chamber 10 has an inlet opening 11 communicating via a check valve 12 with a surrounding oil reservoir 13', this reservoir being formed as a compartment of a chamber 13 surrounding the sleeve extension 2". Another check valve 20 is inserted in an outlet 42 whence a conduit 19' extends to the oil compartment 17 of the pressure accumulator; valve 20 comprises a movable element 22 adapted to be pressed by a spring 21 against a seat 23, the tip 22' of this element extending into the path of a camming formation 28' constituted by the beveled upper end of a collar 28 gripping the cylinder 3. In a similar manner, a regulating valve 24 has a movable member 26 urged under pressure of a spring 26 against a seat 25, the tip 25' of this member extending into the path of cam 28'.

With chamber 13 sealed against the atmosphere, the liquid in reservoir 13' is held under a certain pressure by a membrane 15 separating this reservoir from a space 14 filled with compressed gas (e.g. air).

In operation, the effective length of a shock-absorber assembly 3–5 will usually fluctuate about a mean value determined by the loading of the vehicle. With a moderate load, the mean position of the assembly will be as shown in FIG. 1, with cam 28' holding the outlet valve 20 permanently open for free bidirectional fluid flow therethrough. Under these circumstances, a direct connection extends from compartment 17 to pumping chamber 10 so that oil displaced from that compartment by the descending cylinder 3 may escape into the chamber 10, and may exit from that chamber upon a subsequent rise of the cylinder, whereby the pressure in chamber 10 remains substantially constant and greater than that of gas cushion 14 so that inlet valve 11 stays closed and the average oil volume in compartment 17 is not changed.

If, now, the vehicle is additionally loaded to an extent causing the cam 28' to clear the tip 22' of valve member 22, valve 20 acts as a normal check valve and is unidirectionally effective to admit oil into compartment 17 without letting it escape therefrom. The resulting increase in the pressure of the gas (e.g. air) trapped within compartment 16 tends to restore the assembly to its illustrated position in which the shock absorbed continues to operate in the aforedescribed manner.

If the vehicle is unloaded sufficiently to let the cam 28' engage the tip 26' of valve member 26, valve 24 is held permanently open to vent the compartment 17 to the reservoir 13' by way of the similarly unblocked valve 20. Thus, excess oil may now return to the reservoir 13 until the gas pressure in compartment 16 has been reduced sufficiently to re-establish the position of FIG. 1.

The system of FIG. 2, in which corresponding elements have been given the same designation as in FIG. 1, has a fluid reservoir 13a open to the atmosphere so that the oil therein is held under atmospheric pressure from an overlying volume of air 14a. In this embodiment, conduit 19' opens at its upper end directly into pumping chamber 10, its lower end communicating with oil compartment 17 by way of a check valve 30 replacing the valve 20 of FIG. 1. Valve 30 has an annular seat 33 against which its mobile element 31 is normally urged by a compression spring 32, the latter being anchored at its upper end to the bottom 3' of cylinder 3 while being also positively connected at its lower end with valve 31. Screw cap 41 is traversed by the bottom end of conduit 19' to establish a continuous fluid path from chamber 10 via a bore 34 to the ring space bounded by seat 33. With membrane 18 secured to the mobile valve body 31, this ring space opens into liquid compartment 17 whenever the pressure in pipe 19' is sufficient to lift the valve body 39 off its seat against the force of spring 32, or when the cylinder 3 is raised sufficiently to convert the spring 32 into a resilient link adapted to remove the valve body 31 mechanically from seat 33.

It should be noted that the position illustrated in FIG. 2, in which the regulating valve 24 is not engaged by cam 28', is a contracted position of abnormally heavy load in which oil from the chamber 10 is pumped in the aforedescribed manner into compartment 17 to increase the gas pressure in compartment 16. In the normal or intermediate position of the shock absorber 3, 5 of FIG. 2, valve 24 is cammed open so as to annul the pumping effect due to relative displacement of cylinder 3 and piston 5. Upon sufficient reduction of the load to let the spring 32 unblock the valve 30 for bidirectional flow, compartment 17 is vented to reservoir 13a through valves 30 and 24 in series.

The illustrated connection between membrane 18 and the mobile part 31 of valve 30 ensures a fluidtight seal between the two compartments 16 and 17 of FIG. 2 while also enabling the use of a relatively light spring 32 since its valve-closing section is aided by the membrane. Naturally, a normally sealed passage (not shown) for the admission of a predetermined amount of air or other gas into compartment 16 similar to bore 19 of FIG. 1, will also have to be provided in the system of FIG. 2.

I claim:

1. In a vehicular suspension system having a wheel-supporting part and a body-supporting part movable relatively to each other, and shock-absorbing means including a cylinder secured to one of said parts and a piston secured to the other of said parts, the combination therewith of a sleeve secured to said piston and surrounding at least a portion of said cylinder for defining therewith a pressure-accumulating space, mobile partition means dividing said space into a gas compartment and a liquid compartment, a reservoir for hydraulic fluid, a pumping chamber having two relatively movable walls respectively connected with said cylinder and with said piston for varying the volume of said chamber in response to relative oscillations of said parts, unidirectionally effective first valve means connecting said chamber with said liquid compartment, unidirectionally effective second valve means connecting said chamber with said reservoir, said first and second valve means being oriented to admit fluid from said reservoir to said liquid compartment by way of said pumping chamber in a relatively contracted position of said shock-absorbing means, and venting means for returning excess fluid from said liquid compartment to said reservoir in a relatively extended position of said shock-absorbing means.

2. The combination defined in claim 1 wherein said venting means comprises spring-loaded third valve means shunting said second valve means for establishing a high-resistance escape path for excess fluid from said chamber to said reservoir, said shock-absorbing means being provided with actuating means for unblocking both said first and third valve means in said extended position for free bidirectional flow.

3. The combination defined in claim 2 wherein said actuating means is positioned to open one of said valve means in an intermediate position of said shock-absorbing means for free bidirectional flow, thereby making said pumping chamber ineffectual during normal loading of the vehicle.

4. The combination defined in claim 2 wherein said actuating means is positioned to open one of the two last-mentioned valve means in an intermediate position of said shock-absorbing means for free bidirectional flow, thereby making said pumping chamber ineffectual during normal loading of the vehicle.

5. The combination defined in claim 4 wherein said sleve has an extension spacedly surrounding part of said cylinder and forming said pumping chamber therewith, said movable walls being respective rings secured to the outer surface of said cylinder and to the inner surface of said extension.

6. The combination defined in claim 5 wherein said third valve means has a member seated in said extension, said actuating means comprising a cam on said outer surface coacting with said member.

7. The combination defined in claim 6 wherein said first valve means comprises a check valve seated in said extension, said actuating means including another cam on said outer surface positioned to coact with said check valve prior to engagement of said member by the first-mentioned cam upon relative motion of said piston and cylinder toward said extended position.

8. The combination defined in claim 7 wherein both said cams are part of a collar surrounding said cylinder in said chamber.

9. The combination defined in claim 6 wherein said first valve means comprises a check valve disposed in said liquid compartment, said actuating means further including a link extending from an end of said cylinder and engaging a mobile element of said check valve.

10. The combination defined in claim 9 wherein said link comprises a compression spring anchored to said end and to said element for normally holding the latter against a seat but removing said element from said seat in said extended position.

References Cited
UNITED STATES PATENTS 3,083,026 3/1963 Broadwell _____ 280—64
3,353,816 11/1967 Axthammer _____ 267—64

PHILIP GOODMAN, Primary Examiner

U.S. Cl. X.R.

267—64